United States Patent
Ryba (10) Patent No.: US 11,366,232 B2
(45) Date of Patent: Jun. 21, 2022

(54) DYNAMIC MODE FORMING FOR GPS ANTI-JAM CONTROLLED RECEPTION PATTERN ARRAYS

(71) Applicant: BAE SYSTEMS Information and Electronic Systems Integration Inc., Nashua, NH (US)

(72) Inventor: Martin F. Ryba, Acton, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 129 days.

(21) Appl. No.: 16/833,873

(22) Filed: Mar. 30, 2020

(65) Prior Publication Data
US 2021/0302594 A1    Sep. 30, 2021

(51) Int. Cl.
G01S 19/21    (2010.01)
G01S 19/18    (2010.01)
G01S 19/14    (2010.01)

(52) U.S. Cl.
CPC .............. *G01S 19/21* (2013.01); *G01S 19/18* (2013.01); *G01S 19/14* (2013.01)

(58) Field of Classification Search
CPC ........... G01S 19/21; G01S 19/18; G01S 19/14
USPC .................. 342/357.59, 357.56, 357.52, 360
See application file for complete search history.

(56) References Cited

U.S. PATENT DOCUMENTS

| | | | | |
|---|---|---|---|---|
| 5,917,446 A * | 6/1999 | Greenspan | ............... | H04K 3/90 342/373 |
| 6,084,540 A * | 7/2000 | Yu | .......... | H04K 3/228 342/17 |
| 7,577,464 B2 * | 8/2009 | Ezal | ....... | H01Q 21/29 342/149 |
| 8,049,667 B2 | 11/2011 | Lackey | | |
| 8,154,445 B2 * | 4/2012 | Maenpa | ................. | G01S 19/23 342/357.77 |
| 8,305,265 B2 | 11/2012 | Ezal et al. | | |
| 10,024,973 B1 * | 7/2018 | Alexander | ............ | G01S 19/215 |
| 10,739,466 B2 * | 8/2020 | Grobert | ................. | H04K 3/228 |
| 10,948,602 B1 * | 3/2021 | Alexander | ............. | G01S 19/21 |
| 11,073,622 B2 * | 7/2021 | Cohen | .................... | G01S 19/11 |
| 11,255,977 B2 * | 2/2022 | Stockmaster | .......... | H04B 7/088 |

(Continued)

OTHER PUBLICATIONS

International Search Report, PCT/US21/24763, dated Jun. 29, 2021, 8 pages.

(Continued)

*Primary Examiner* — Chuong P Nguyen
(74) *Attorney, Agent, or Firm* — KPIP Law, PLLC; Gary McFaline (57) ABSTRACT

The system and method for dynamic mode forming for a global positioning/global navigation system. The system having a controlled reception pattern antenna (CRPA) mounted on a platform; an antenna electronics subsystem configured for dynamically maximizing gain in the controlled reception pattern antenna; and a global positioning/global navigation receiver subsystem configured for null processing, wherein a state of the platform is used to modify a reference mode and a plurality of auxiliary modes for the controlled reception pattern antenna in real-time based on an apriori look up table (LUT) to dynamically maximize a gain of the controlled reception pattern antenna.

12 Claims, 10 Drawing Sheets

(56) References Cited

U.S. PATENT DOCUMENTS

| | | | |
|---|---|---|---|
| 2007/0293150 A1* | 12/2007 | Ezal | H01Q 1/243 455/25 |
| 2011/0241939 A1* | 10/2011 | Maenpa | G01S 19/23 342/368 |
| 2016/0011318 A1* | 1/2016 | Cohen | G01S 19/425 342/357.26 |
| 2017/0227650 A1 | 8/2017 | Grobert | |
| 2020/0235843 A1* | 7/2020 | Zemany | H01Q 3/2611 |

OTHER PUBLICATIONS

Z. Ugray et al., "Scatter Search and Local NLP Solvers: A Multistart Framework for Global Optimization", Informs Journal on Computing, vol. 19, No. 3, Summer 2007, pp. 328-340.

* cited by examiner

DYNAMIC MODE FORMING FOR GPS ANTI-JAM CONTROLLED RECEPTION PATTERN ARRAYS

FIELD OF THE DISCLOSURE

The present disclosure relates to the field of Global Positioning System (GPS)/Global Navigation Satellite Systems (GNSS) and more particularly to the user equipment of such systems operating in environments with significant Electro-Magnetic Interference (EMI). It is to be understood that interference may be intentional (jamming) or unintentional.

BACKGROUND OF THE DISCLOSURE

Both commercial and military users have increasingly procured receivers with Controlled Reception Pattern Antennas (CRPAs) backed by antenna electronics (AE) that process signals to minimize interference. However, existing small CRPAs often have poor anti-jam (AJ) performance. One such challenge for these systems is in maintaining adequate gain for the desired satellite signals while simultaneously providing the required nulling behavior to any interference (e.g., jamming) signals.

Wherefore it is an object of the present disclosure to overcome the above-mentioned shortcomings and drawbacks associated with conventional anti-jam (AJ) performance for Controlled Reception Pattern Antennas (CRPAs) on a moving platform by dynamically maximizing gain for the antenna system using the platform's attitude in real-time.

SUMMARY OF THE DISCLOSURE

This disclosure mitigates these issues by providing a system and techniques to dynamically maximize the desired gain while also dynamically accounting for changing attitude of the platform which comprises the CRPA. Attitude for a flying platform, e.g., a plane, is its orientation in space according to three orthogonal axes. For the example of an airplane, rotation about the longitudinal axis is called roll, rotation about the lateral axis (along the wings) is called pitch, and rotation about the vertical axis is called yaw. As used herein, dynamic mode forming refers to systematic adjustment of the effective desired "reference" antenna pattern used to collect the signal from the navigation satellites.

One aspect of the present disclosure is a method of dynamic mode forming for global positioning/global navigation systems, comprising: providing a controlled reception pattern array (CRPA) mounted on a platform; providing antenna electronics configured for dynamically maximizing gain in the controlled reception pattern array; modifying a reference mode and a plurality of auxiliary modes for the controlled reception pattern array (CRPA) in real-time as a function of the platform's state using a created look up table (LUT); performing null processing on the reference mode and the plurality of auxiliary modes; and providing the output from null processing to a global positioning/global navigation receiver subsystem for use in global positioning/global navigation for the platform.

One embodiment of the method of dynamic mode forming for global positioning/global navigation systems is wherein given N antenna inputs, up to N modes can be formed.

Another embodiment of the method of dynamic mode forming for global positioning/global navigation systems further comprises using an N×N complex matrix consisting of orthonormal vectors to create the look up table (LUT) such that the result is an N-dimensional rotation.

Yet another embodiment of the method of dynamic mode forming for global positioning/global navigation systems further comprises using linear algebra to show that every orthonormal basis set can represent the instantaneous array signal vector with equal validity. In some cases, the platform's state comprises the platform's attitude. In certain embodiments, the platform is a guided projectile.

Another aspect of the present disclosure is a system for dynamic mode forming for global positioning/global navigation systems, comprising: a controlled reception pattern array (CRPA) mounted on a platform; an antenna electronics subsystem configured for dynamically maximizing gain in the controlled reception pattern array; and a global positioning/global navigation receiver subsystem used for null processing, wherein the platform's state is used to modify a reference mode and a plurality of auxiliary modes for the controlled reception pattern array in real-time based on a created look up table (LUT) to dynamically maximize the gain of the controlled reception pattern array for use in in global positioning/global navigation for the platform.

One embodiment of the system for dynamic mode forming for global positioning/global navigation systems is wherein the platform's state comprises the platform's attitude. In some cases, the platform is a guided projectile.

Another embodiment of the system for dynamic mode forming for global positioning/global navigation systems is wherein given N antenna inputs, up to N modes can be formed.

Yet another embodiment of the system for dynamic mode forming for global positioning/global navigation systems is wherein a N×N complex matrix consisting of orthonormal vectors is used to create the look up table (LUT) such that the result is an N-dimensional rotation.

Still yet another embodiment to the system for dynamic mode forming for global positioning/global navigation systems is wherein linear algebra is used to show that every orthonormal basis set can represent the instantaneous array signal vector with equal validity.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

It has been recognized that resilient global positioning/global navigation operations are critical to both military and civilian users of many systems, including systems with Size, Weight, and Power (SWaP) constraints which limit the size of a CRPA that can be mounted on a particular platform. CRPAs work by exploiting spatial diversity; or capitalizing on the fact that desired signals and undesired jamming signals generally arrive from different directions. In simple terms, a spatial filter is created to remove signals that arrive from particular directions, while letting signals from other directions through. To achieve this, rather than using a single antenna, an array of antenna elements is used, e.g. a CRPA.

For the sake of simplicity, we will assume the desired signal is a simple sine wave. The output from each antenna element would then be that same sine wave, but with a different phase shift depending on the spatial arrangement of the antenna elements. These phase shifts can be equated to weights. By carefully choosing the weights, each of the antenna outputs can be aligned in phase, and then, when all the outputs are summed together, a stronger version of the input signal can be obtained. This can be referred to as "beamforming," or steering maximum antenna gain towards a GPS satellite, for example. Conversely, the weights can be chosen to minimize or completely cancel out a signal. This, is referred to as "nulling" or "null-steering" and is done if the signal is an interference signal, e.g., from a jammer.

The present disclosure relates to the field of Global Positioning System (GPS)/Global Navigation Satellite Systems (GNSS) and more particularly to the user equipment of such systems operating in environments with significant Electro-Magnetic Interference (EMI). That interference may be intentional (jamming) or unintentional. Both commercial and military users may use receivers with Controlled Reception Pattern Arrays (CRPAs) backed by antenna electronics (AE) that process incoming signals to minimize interference.

Currently, GPS Adaptive Nulling Anti-Jam (AJ) systems are required and deployed on numerous military platforms, from ships to airplanes and to all forms of guided weapons (e.g., missiles, artillery, projectiles, rounds, etc.). The common factor across many of the adaptive nulling algorithms and their present implementations is the need to define a "reference" channel or mode. This channel is usually tied to a specific antenna element of a controlled reception pattern array (CRPA) and is supposed to preferentially create a nearly hemispherical gain pattern in the upper hemisphere (the hemisphere pointed towards the GPS satellites). The algorithms use various forms of a "constraint vector" on the adaptive algorithms to maintain this pattern as much as possible despite jamming signals arriving from various angles inside and outside of that hemisphere.

The system and method for a multiple element antenna structure where a plurality of antenna elements cover frequencies of interest and provide nominal (quiescent) gain covering at least approximately one hemisphere of solid angle in a desired direction independent of a host platform's attitude. This removes the constraint that each element must have near hemispherical coverage and improves performance on platforms with large attitude (roll, pitch) changes (e.g., a projectile). The system may contain an array signal processing system comprising multiple coherent radio receivers and associated signal processing functions to create the (analog or digital) output signal(s) to be fed to a GPS (or other system) receiving function.

Figure 1:
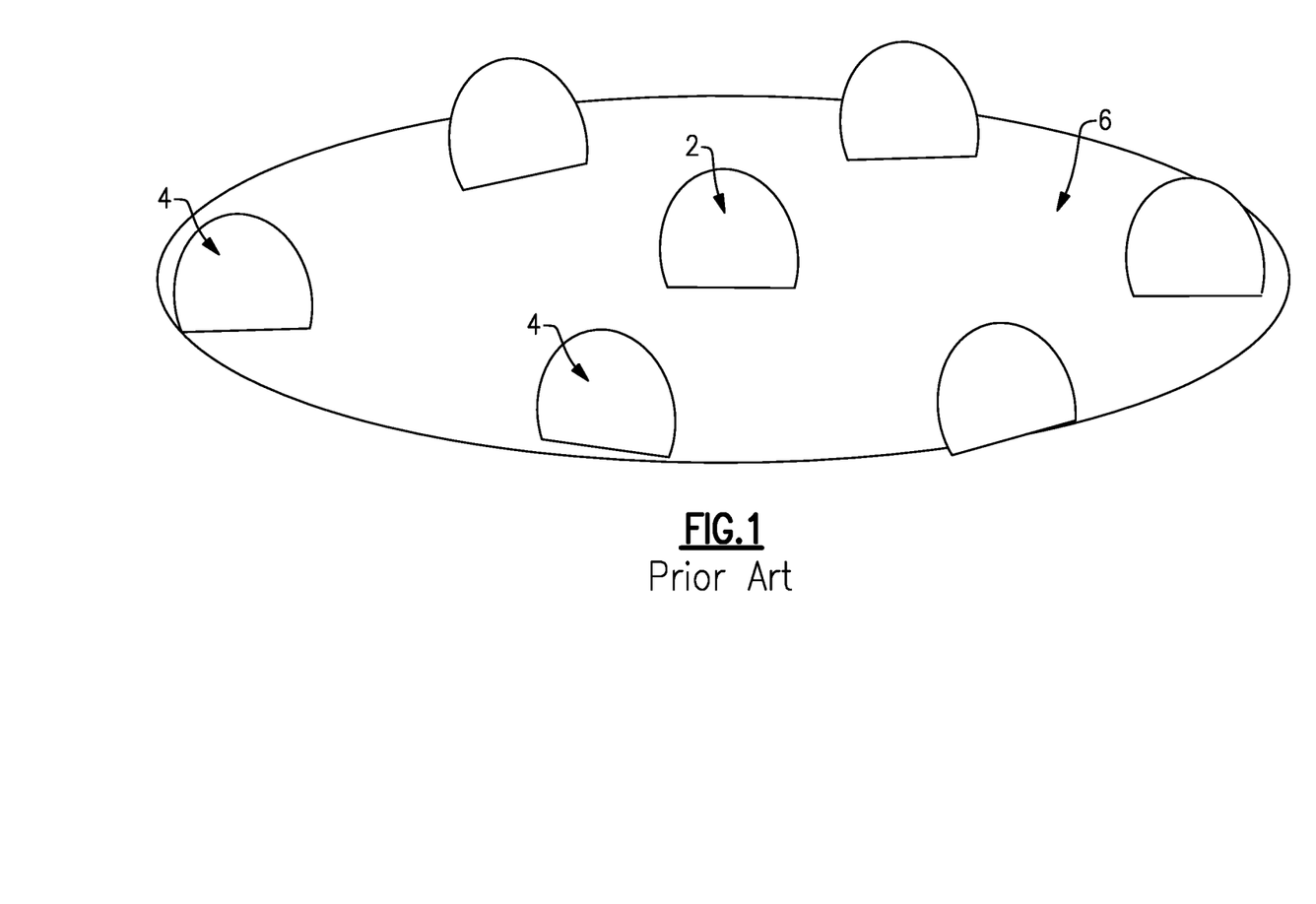
FIG. 1 shows a diagram of a prior art controlled reception pattern array (CRPA), known as a seven-element "pizza plate" aperture.

Referring to FIG. 1, a diagram of a prior art Controlled Reception Pattern Antenna (CRPA), known as a seven-element "pizza plate" aperture is shown. More specifically, the center element 2 is the reference element, and the six elements around the perimeter 4 are the auxiliary elements used to provide the degrees of freedom necessary to spatially null incoming jamming, such as broadband jamming. Broadband jamming refers to energy that occupies a large portion of the spectrum that is occupied by the desired signal. Such jamming cannot be easily removed by single-element antenna algorithms. As long as the "pizza plate" 6 of the antenna elements 2, 4 points mostly in the "up" direction, good reception is maintained. Note that for tactical aircraft, for example, this assumption is not always correct and significant dropouts can occur when the platform pitches or rolls significantly during operation of the platform. The assumption is even more difficult to maintain with small form factor CRPAs that have little to no ground plane beneath them.

In other conventional systems, an "omni" reference mode is formed by a summing (with appropriate phase shifts) of several of the antenna signals. This summing was initially done with an analog circuit. While this method reduces thermal noise, it retains distortions and losses. More recent implementations of this "omni" approach use a digital mode former. While this approach, with a hard-coded mode vector, may be sufficient for some applications, it is strained when applied to a small moving platform, e.g. a munition, where the platform may roll or tilt enough to alter the preferred set of mode coefficients.

In some AJ implementations, mode forming can be performed instead by modifying the constraint vector inside the algorithm. This is similar to what is done in beam steering implementations where the constraint is modified to steer a beam in a particular direction, i.e., at a desired satellite. Current implementations deterministically compute the mode weights via geometry assuming the "pizza plate" array. In contrast, the present disclosure generalizes to more complicated arrays e.g., the CRPA shown in FIG. 2, FIG. 3A and FIG. 3B. In certain embodiments, integration into beam steering conserves operations (e.g., the auxiliary beams do not need to be computed).

Figure 2:
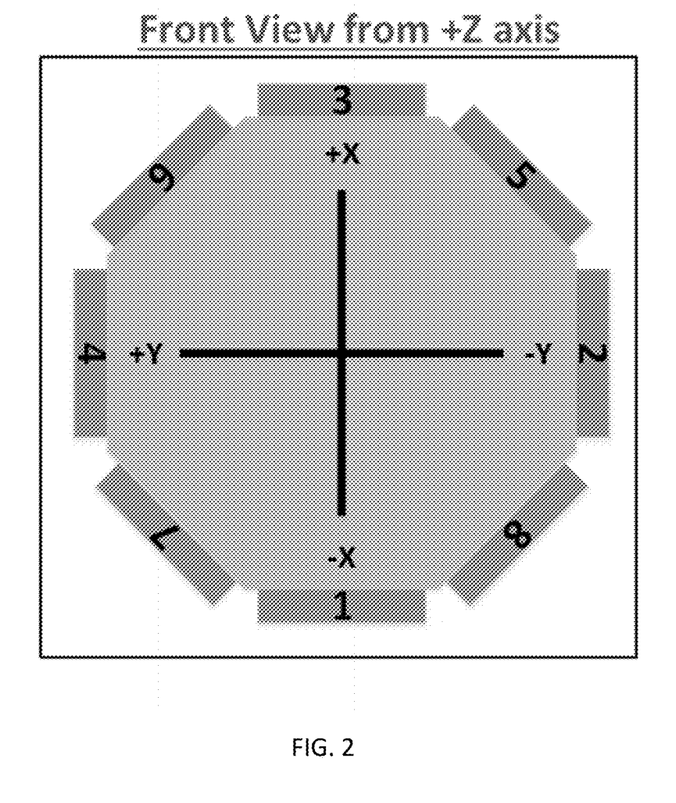
FIG. 2 shows a front view of one embodiment of a CRPA antenna placement for a projectile viewed along the Z axis according to the principles of the present disclosure.
Figure 3A:
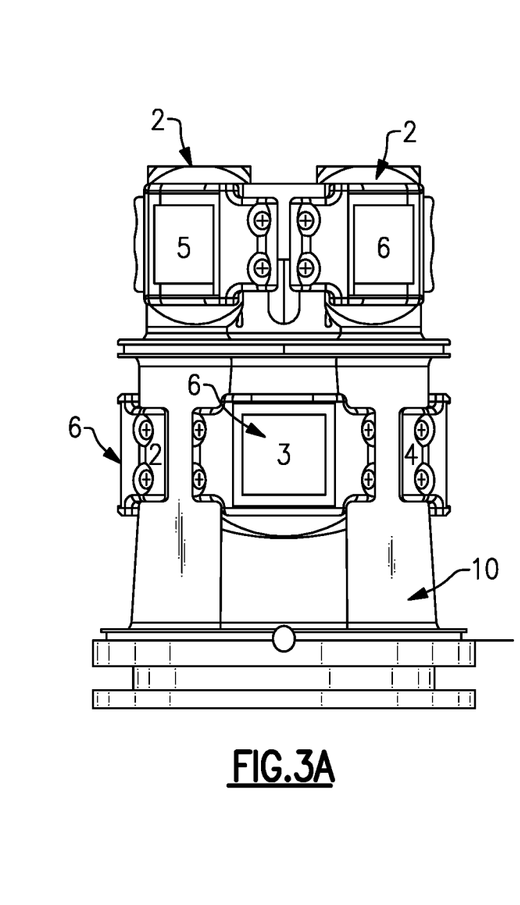
FIG. 3A shows a top view of one embodiment of a CRPA antenna placement for a projectile viewed along the +X axis according to the principles of the present disclosure.
Figure 3B:
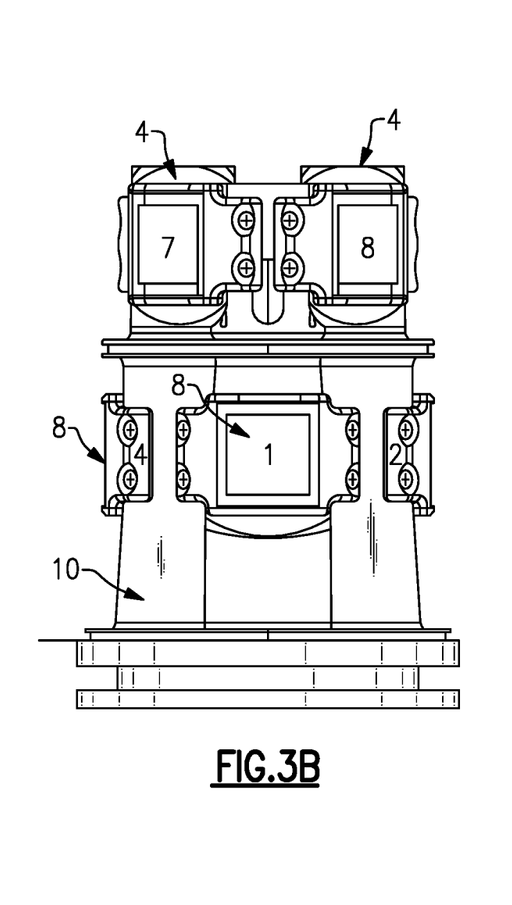
FIG. 3B shows a top view of one embodiment of a CRPA antenna placement for a projectile viewed along the −X axis according to the principles of the present disclosure.

Referring to FIG. 2, FIG. 3A and FIG. 3B, one embodiment of a CRPA mounted on a projectile according to the principles of the present disclosure is shown. More specifically, FIG. 2 shows a front view (looking down the nose) of one embodiment of an antennae placement for a projectile viewed along the Z axis. FIG. 3A shows a top side view of one embodiment of an antennae placement for a projectile viewed along the +X axis according to the principles of the present disclosure. FIG. 3B shows a bottom side view of one embodiment of an antennae placement for a projectile guidance kit viewed along the −X axis according to the principles of the present disclosure. In FIG. 3A and FIG. 3B, it is possible to see that four of the eight elements in this embodiment are upper elements (2, 4) and four of the eight elements are lower elements (6, 8) and they are offset with respect to each other when placed around the periphery of the platform 10 (e.g., a projectile).

One challenge for this embodiment of the system is the fact that the manifold has a reference frame, as shown in FIG. 2, where the Z axis (the nose) is "up." The "manifold" for an array of some number (N) of elements, as a function of the azimuth and elevation angles, is a surface embedded in an N-dimensional complex space. The performance of the array is a function of the properties of that space which is in turn a function of the array's geometry.

Figure 4A:
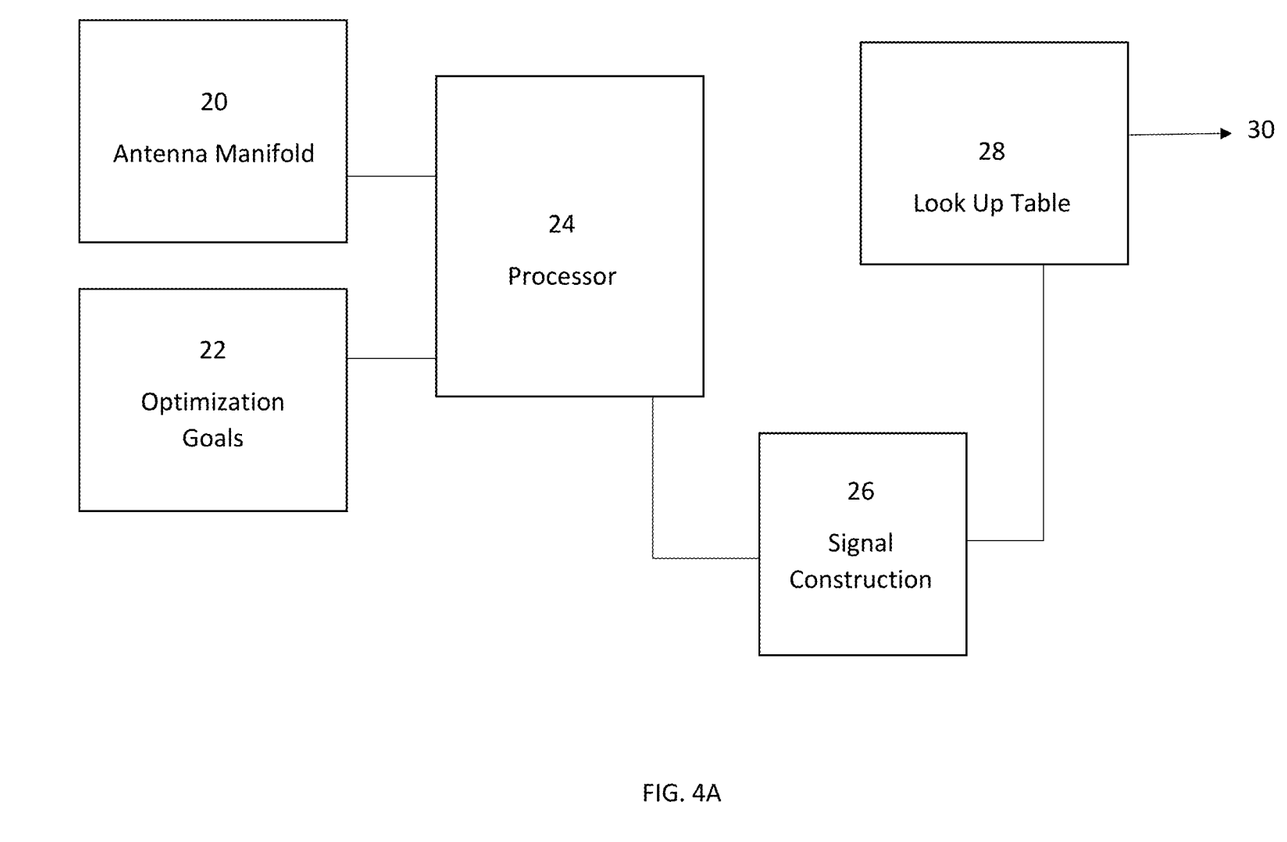
FIG. 4A shows a diagrammatic view of one embodiment of the system of the present disclosure for creating the look up table of reference and auxiliary modes for use in a dynamic mode forming process for global positioning/global navigation applications.
Figure 4B:
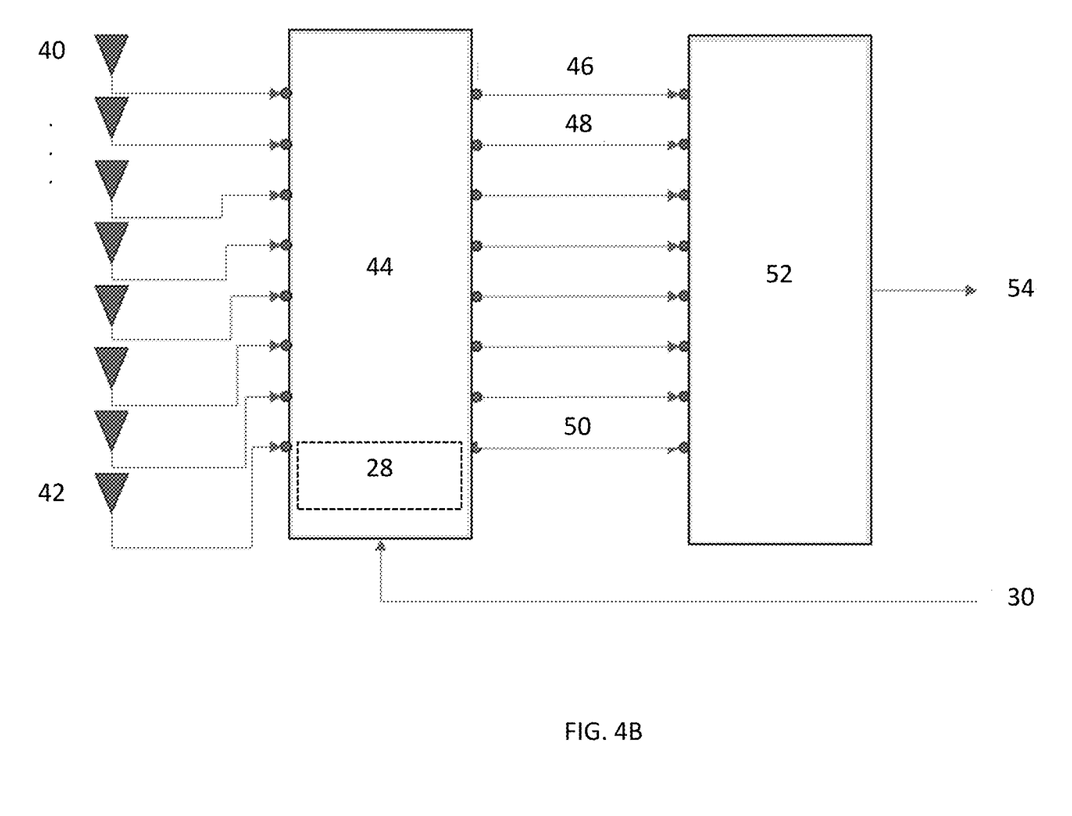
FIG. 4B shows a diagrammatic view of one embodiment of the system of the present disclosure having adapted antenna electronics with a dynamic mode forming process for global positioning/global navigation applications.

In this embodiment of the system, the implementation flow of the algorithm is illustrated in FIG. 4A and FIG. 4B. FIG. 4A refers to a one-time process to develop the mode forming Look Up Table (LUT) (30). FIG. 4B refers to the in-situ application of the algorithm inside the platform where the LUT is used in the processing in 44. For any given orientation of the platform shown in FIG. 2-3B, a preferred "up" direction is defined. The antenna element patterns are rotated and resampled from their native frame into a convenient frame with for instance the preferred "up" direction along for instance the new "Z" axis. See, for example one element's pattern is depicted in FIGS. 5A-F and FIG. 6 shows where the final product has "up" along the Z axis.

In certain embodiments, heading variation for the platform is ignored. This assumption holds true since the GPS constellation used is sufficiently uniformly distributed. Given the platform's attitude, two angles are parameterized (calculated) and used to describe the orientation of the CPRA with respect to a local zenith or some other preferred direction. In the case of a guided munition, for example, the reference vector can be biased towards the launch direction. In some cases, a roll-only model is used especially during the initial ascent.

Referring to the one-time algorithm flow FIG. 4A, once the patterns are rotated, the optimization process can be invoked. An initial "cost" function is defined. Optimization algorithms generally attempt to minimize the cost function, which is the inverse of "goodness" if something is intended to be maximized. In one embodiment of the system, the overall cost function is for instance a weighted combination of three desired characteristics: maximization of the gain in the "upper hemisphere (or some portion thereof), the avoidance of gaps in gain in that same region (gaps cause dropouts which affect performance), and the minimization of gain in an antipodal lower hemispherical cap.

Figure 6:
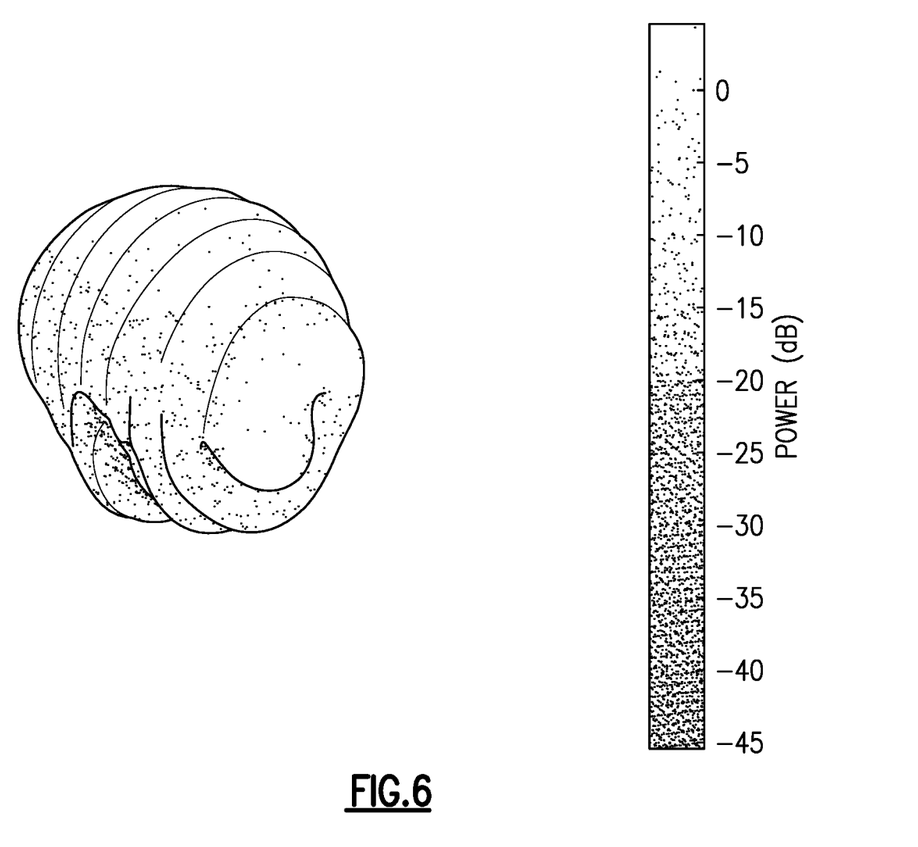
FIG. 6 shows a three-dimensional element pattern for a reference mode of a CRPA antenna according to the principles of the present disclosure.

In one embodiment, a "global search" method using a nonlinear bounded constrained optimizer is used. The initial constraint on the reference mode is that the sum of the complex magnitudes squared of the weights must equal 1. This prevents the algorithm from inserting artificial gain. In this embodiment, there are 16 variables optimized (the real and imaginary component of each weight for each of the 8 elements) subject to the one constraint. In the example where the "up" direction coincides with the +X axis of FIG. 2, the resulting mode vector featured a strong weighting of element 3 (41% of the power) but showed significant contribution from element 5 (22%) as well. The phases were also important to consider. The mode vector was used to create the total mode rotation matrix using a Gram-Schmidt orthonormal algorithm, and a new antenna manifold was created. The resulting reference mode is shown in FIG. 6.

Referring to FIG. 4A, a diagrammatic view of one embodiment of the system of the present disclosure for creating auxiliary modes for use in a dynamic mode forming process is shown. More particularly, in one embodiment the antenna manifold 20 for the antenna array comprises the required input data from either measured (preferred) or modeled antenna pattern data including mutual coupling. Any system optimization goals 22 (e.g., hemispheric gain, etc.) for a particular application are fed into the processing section 24 of the system. In the processing section 24, the initial condition (starting mode vector) uses an array element closest in angle to the preferred direction. The preferred direction refers to the direction of the incoming desired signal. In one embodiment, the weight of the array element closest in angle to the preferred direction is set to 1.0, and the rest are set to zero. More exhaustive "global optimization" routines can also be used.

In certain embodiments, arrays with obvious structure can use their respective default reference mode as a starting point. In certain embodiments, "simulated annealing" or "particle flow" algorithms may be used for running an optimization to uncover optimal value functions, starting conditions, and the like. There is extensive prior art in the field of nonlinear optimization that may be applied to various specific embodiments. All of the algorithms are generally realized as computer software and the processes described in FIG. 4A are intended for use on general purpose computers. In certain embodiments, the generation of a reference mode and the auxiliary modes (optionally as a function of attitude) is done prior to operation of the real-time nulling algorithm shown in FIG. 4B. Still in the processor 24, optimization as function of the platform's attitude is calculated. A reference mode is calculated and fed into the next module where auxiliary modes are created.

In one embodiment of the dynamic mode forming system of the present disclosure, once an initial reference vector in the "moding space" has been determined, the auxiliary channel signals can be constructed in the signal construction section 26 such as via a Gram-Schmidt orthogonal construction, or the like. In other embodiments, similar cost functions for goodness of the auxiliary modes can be defined and the constraints can be augmented by the requirement that each auxiliary mode must be orthogonal to all the modes (reference and auxiliary) which have been defined so far. Thus, via an iterative process, the auxiliary mode for every desired mode (up to the number of array elements) can be defined. The results for the reference and the plurality of auxiliary modes for a given platform orientation are assembled along with those for all other orientations into a Look Up Table (LUT), or the like, 28 of the off-line algorithm. The consolidated (potentially attitude dependent) LUT is the final product of element 4A of the present disclosure. In certain embodiments, the auxiliary modes could be further optimized.

In certain embodiments, a CRPA is sufficiently "smooth" (e.g., such as the example in FIG. 6) such that a nearest-neighbor selection process on a 10×10 degree grid over some range of angles is enough to provide overall array performance that is sufficient for the intended application. Thus, in one example, roughly 150 LUT elements can cover an entire range of platform attitudes. Other platforms with larger (or sparse) arrays may require a finer grid. In some embodiments, each matrix consists of about 64 (8×8) complex numbers where a 2-byte fixed point provides adequate resolution. Thus, the storage requirements per angle element may only be about 256 bytes (e.g., 4 bytes per array element, where 2 bytes are I and 2 bytes are Q). In certain embodiments, the 150 matrices of the final LUT occupies only about 40 kB of storage making it applicable in smaller systems, such as on board a projectile, as well as larger systems.

Referring to FIG. 4B, a diagrammatic view of one embodiment of the system of the present disclosure having antenna electronics with a dynamic mode forming module 44 is shown in greater detail. More specifically, a series of antenna elements 40 (a 1' element) to 42 (an $n^{th}$ element) make up an antenna array. The elements' data are processed via the dynamic mode forming process module 44 comprising the LUT 28, which uses the platforms' attitude input 30, to feed into a standard nulling process module 52 using a reference channel 46, and a series of auxiliary channels ranging from a $1^{st}$ auxiliary channel 48 to an $m^{th}$ auxiliary channel 50. There, given N antenna inputs (e.g., 8 channels), up to N modes can be formed. In some cases, the number of modes can be fewer to conserve resources, if needed.

One restriction on the mode generation calculation is the transformation matrix that is used. In one embodiment, an N×N complex matrix consists of orthonormal vectors such that the result is an N-dimensional rotation in order to avoid correlations that destroy the assumptions of channel independence in the anti-jamming algorithm. In all cases, linear algebra can be used to show that every orthonormal basis set can represent the instantaneous array signal vector with equal validity. If it were not for the need for a "reference channel" constraint, as described above, this process would be unnecessary and the implicit identity matrix used in current implementations would be sufficient. In certain embodiments, the created LUT 28 is loaded into a dynamic mode forming process module 44 according to the principles of the present disclosure.

In one embodiment of the system of the present disclosure, platform attitude information 30 is used to alter the set of signals presented 46, 48, 50 to a standard (fixed constraint) nulling process in the nulling section 52 (spatial, space-time, or space-frequency). Once the nulling process has been completed, the anti-jam signal 54 is fed to a Global Navigation Satellite System (GNSS) receiver, or the like, where GNSS is a generic term for satellite navigation systems that provide autonomous geo-spatial positioning with global coverage. In one example the GNSS receiver is on-board a precision guided munition, projectile, or autonomous aerial vehicle (UAV).

One benefit of the system of the present disclosure is an increase in the mean gain over a preferred direction cap, or hemisphere, a greater tolerance to platform maneuver, and improved suppression of jamming in situations where the number of jammers exceeds an array's degrees of freedom. These benefits (e.g., probably a couple dB in mean C/No and jam margin) are similar to those seen in active beam steering AJ systems without the complexity and with the real possibility of an in-situ retrofit into existing systems without large cost because the interface into the rest of the AJ system remains the same.

In satellite communications, carrier-to-noise-density ratio (C/No) is the ratio of the carrier power C to the noise power density No, expressed in dB-Hz. Where a jam margin is the level of interference (jamming) that a system is able to handle and still maintain a specified level of performance. In addition to a limited RAM requirement, the algorithm of the present disclosure requires $N^2$ multiply-accumulate (MAC) operations per input sample; this increase is dwarfed by the approximately $(NT)^3$ operations required by the rest of the AJ algorithm, where T is the number of time/frequency taps in space time adaptive processing (STAP)/space frequency adaptive processing (SFAP) implementations.

Figure 5A:
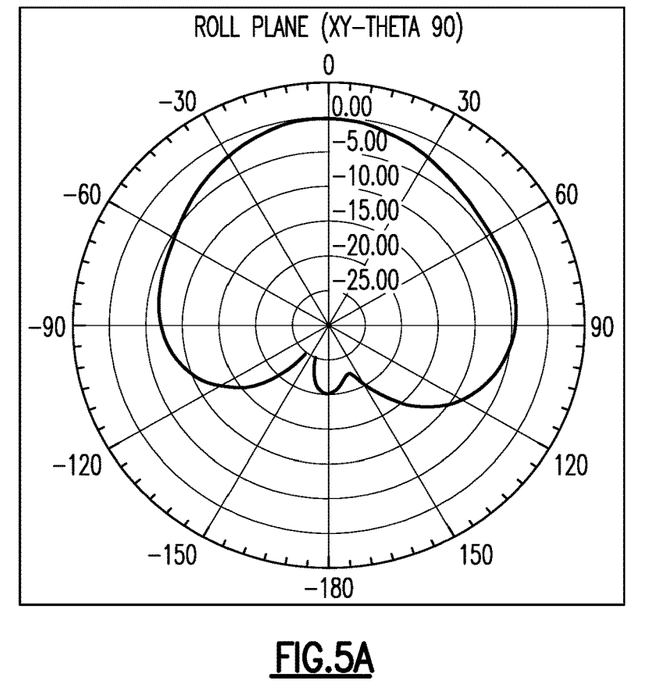
FIG. 5A through FIG. 5F show several radiation patterns for an element of a CRPA antenna of the system of the present disclosure for global positioning/global navigation applications.
Figure 5B:
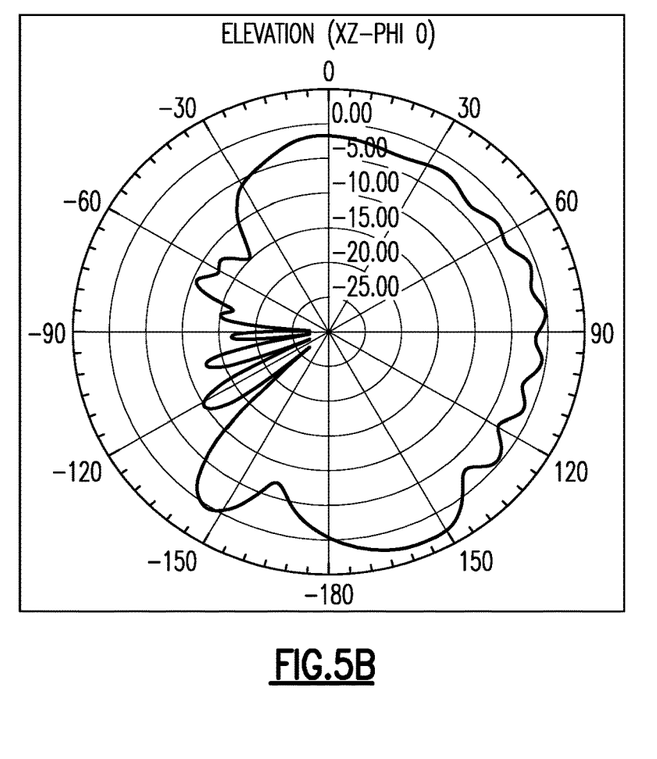
Figure 5C:
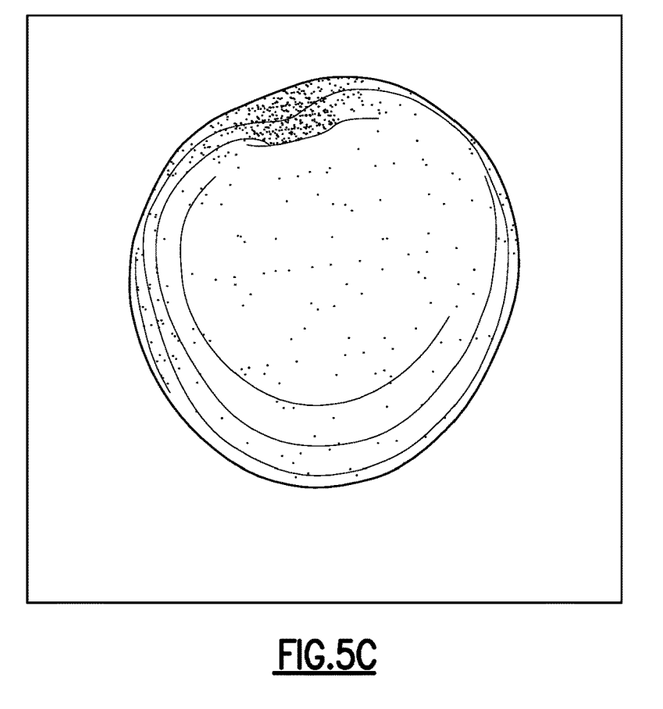
Figure 5D:
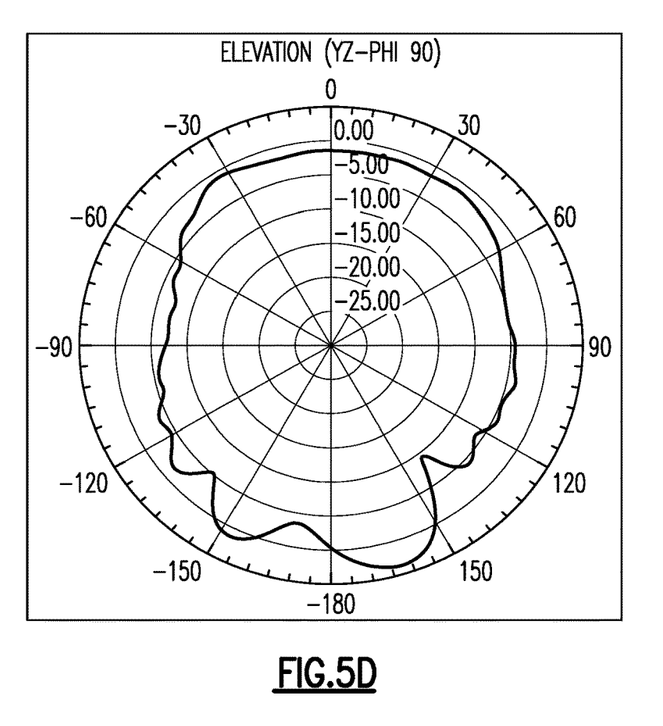
Figure 5E:
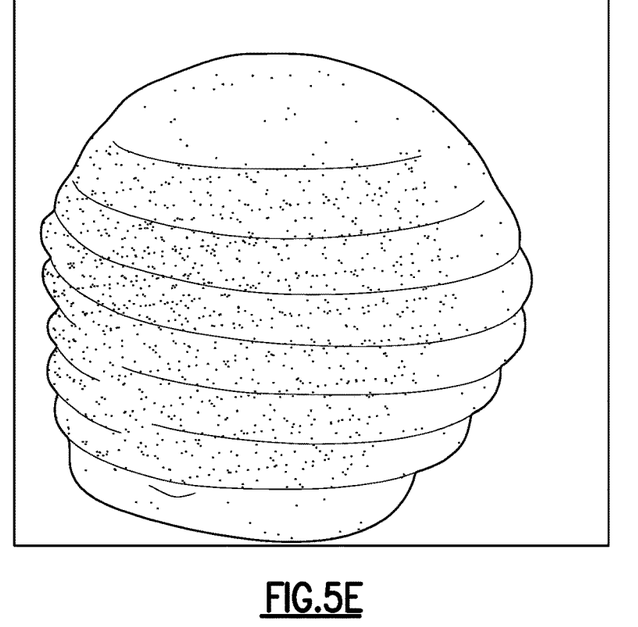
Figure 5F:
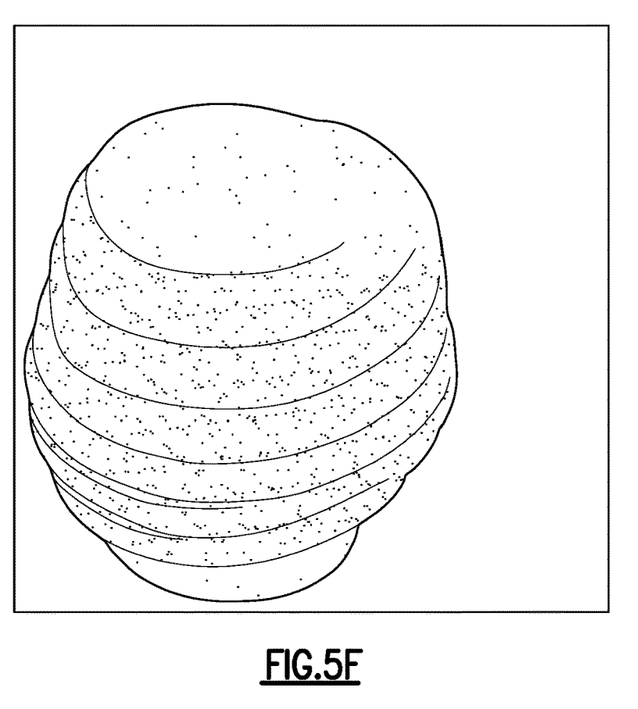

Referring to FIG. 5A through FIG. 5F, an element radiation pattern for one embodiment of the present disclosure is shown in various orientations. More specifically, FIG. 5A is a radiation pattern for a single antenna element of the system of the present disclosure in the roll plane (XY); FIG. 5B shows a radiation pattern for an element of the system of the present disclosure in elevation (XZ); FIG. 5C shows a 3-dimensional representation of the element radiation pattern, with the nose (Z axis) pointing out of the page. This is equivalent to FIG. 5A but rotated 180 degrees in the plane of the page; FIG. 5D shows a radiation pattern for an element of the system of the present disclosure in elevation (YZ); FIG. 5E shows the same 3-dimensional pattern rotated similarly to FIG. 5D; and FIG. 5F shows this 3-dimensional pattern from another aspect angle.

Referring to FIG. 6, a radiation pattern for a reference mode according to the principles of the present disclosure is shown. More specifically, the mean gain above 15° elevation is +1.08 dBi, and the fraction of the surface above 10° with gain better than −3.5 dBi is 86.6%, a significant improvement of prior systems. Furthermore, the low gain in the lower hemisphere helps to suppress jamming prior to adaptation. Inspection of the "auxiliary" modes showed no glaring issues, they have roughly "omni" response (good for nulling jamming), with some suppression of the upper hemisphere. In some cases, this was because that power was pushed into the reference mode, which may have the added benefit of reducing the creation of sympathetic nulls in the upper pattern when jamming is present.

Figure 7:
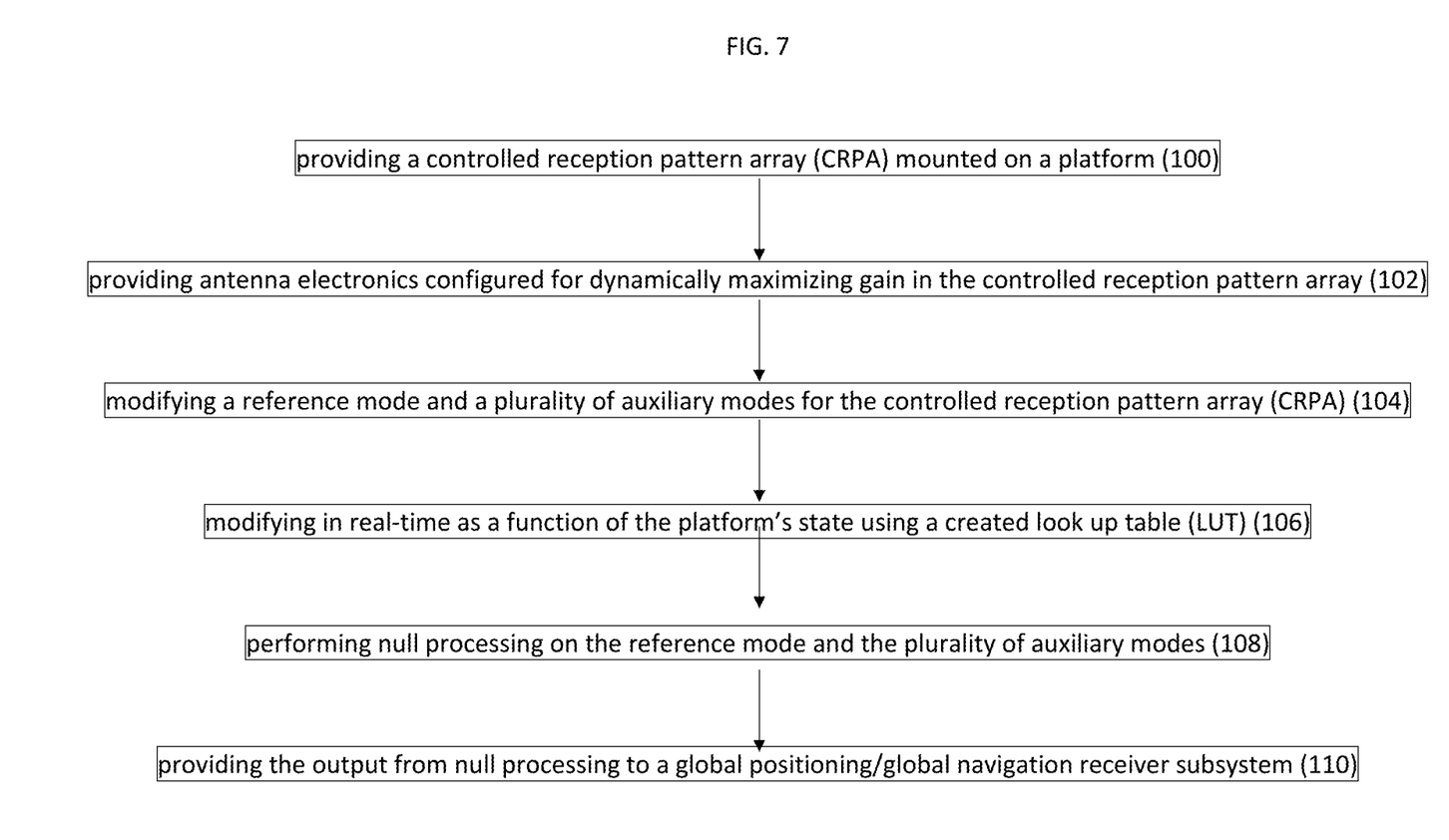
FIG. 7 is a flowchart of one embodiments of a method according to the principles of the present disclosure.

Referring to FIG. 7, a flowchart of one embodiment of a method according to the principles of the present disclosure is shown. More specifically, a controlled reception pattern array (CRPA) is mounted on a platform 100. Antenna electronics are provided, which are configured for dynamically maximizing gain in the controlled reception pattern array (CRPA) 102. A reference mode and a plurality of auxiliary modes are modified for the controlled reception pattern array (CRPA) 104. The modification is in real-time as a function of the platform's state using a created look up table (LUT) 106. Null processing is performed on the reference mode and the plurality of auxiliary modes 108. The output from null processing is then provided to a global positioning/global navigation receiver subsystem for use in global positioning/global navigation for the platform 110.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for dynamic mode forming for a global positioning/global navigation system, comprising:
    a controlled reception pattern antenna (CRPA) mounted on a platform;
    an antenna electronics subsystem configured for dynamically maximizing gain in the controlled reception pattern antenna; and
    a global positioning/global navigation receiver subsystem configured for null processing, wherein a state of the platform is used to modify a reference mode and a plurality of auxiliary modes for the controlled reception pattern antenna in real-time based on an apriori look up table (LUT) to dynamically maximize a gain of the controlled reception pattern antenna.

2. The system for dynamic mode forming for global positioning/global navigation systems according to claim 1, wherein the platform state comprises an attitude of the platform.

3. The system for dynamic mode forming for global positioning/global navigation systems according to claim 1, wherein the platform is a guided projectile.

4. The system for dynamic mode forming for global positioning/global navigation systems according to claim 1, wherein given N antenna inputs, up to N modes can be formed.

5. The system for dynamic mode forming for global positioning/global navigation systems according to claim 1, wherein a N×N complex matrix consisting of orthonormal vectors is used to create the look up table (LUT) such that the result is an N-dimensional rotation.

6. The system for dynamic mode forming for global positioning/global navigation systems according to claim 5, wherein linear algebra is used to show that every orthonormal basis set can represent the instantaneous array signal vector with equal validity.

7. A method of dynamic mode forming for global positioning/global navigation systems, comprising:
    providing a controlled reception pattern array (CRPA) mounted on a platform;
    providing antenna electronics configured for dynamically maximizing gain in the controlled reception pattern array;
    modifying a reference mode and a plurality of auxiliary modes for the controlled reception pattern array (CRPA) in real-time as a function of the platform's state using a created look up table (LUT);
    performing null processing on the reference mode and the plurality of auxiliary modes; and
    providing the output from null processing to a global positioning/global navigation receiver subsystem for use in global positioning/global navigation for the platform.

8. The method of dynamic mode forming for global positioning/global navigation systems of claim 7, wherein given N antenna inputs, up to N modes can be formed.

9. The method of dynamic mode forming for global positioning/global navigation systems of claim 7, further comprising using an N×N complex matrix consisting of orthonormal vectors to create the look up table (LUT) such that the result is an N-dimensional rotation.

10. The method of dynamic mode forming for global positioning/global navigation systems of claim 9, further comprising using linear algebra to show that every orthonormal basis set can represent the instantaneous array signal vector with equal validity.

11. The method of dynamic mode forming for global positioning/global navigation systems of claim 7, wherein the platform's state comprises the platform's attitude.

12. The method of dynamic mode forming for global positioning/global navigation systems of claim 7, wherein the platform is a guided projectile.

* * * * *